Feb. 23, 1971   D. W. MILLER   3,564,888
CONVOLUTION FORMING METHOD AND APPARATUS
Filed Nov. 19, 1968   6 Sheets-Sheet 3

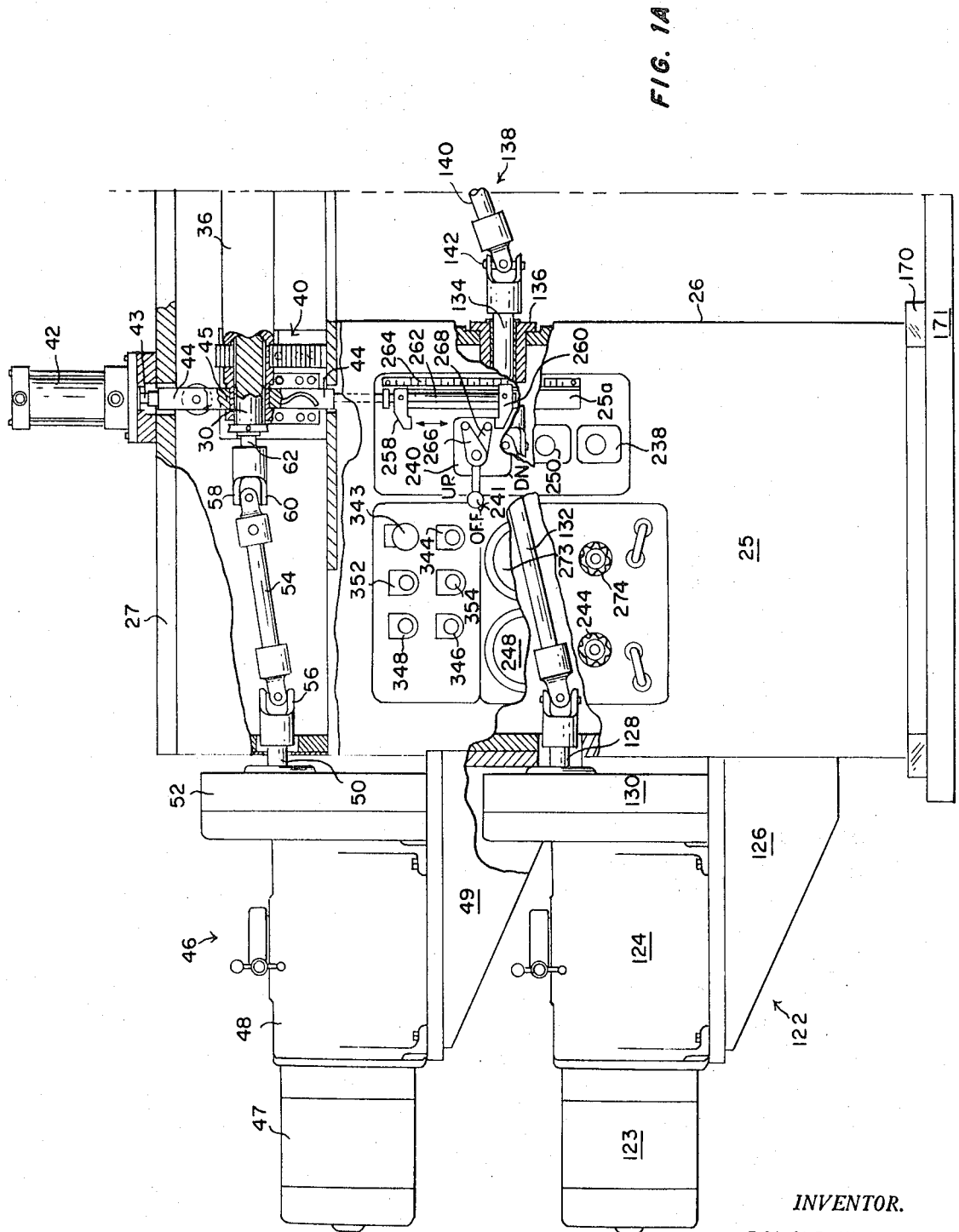

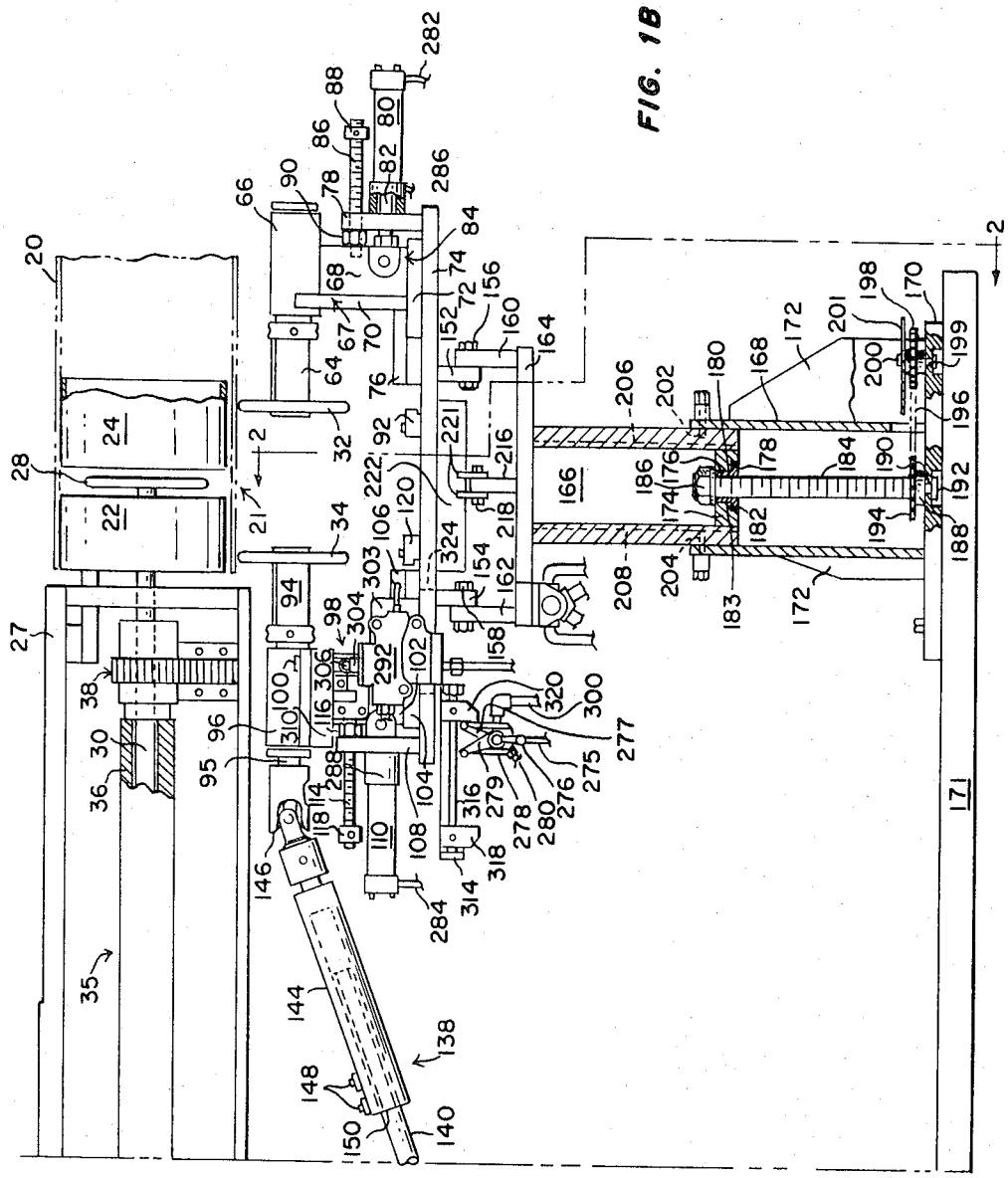

INVENTOR.
DONALD W. MILLER
BY Strauch, Nolan, Neale,
Nies & Kurz

ATTORNEYS

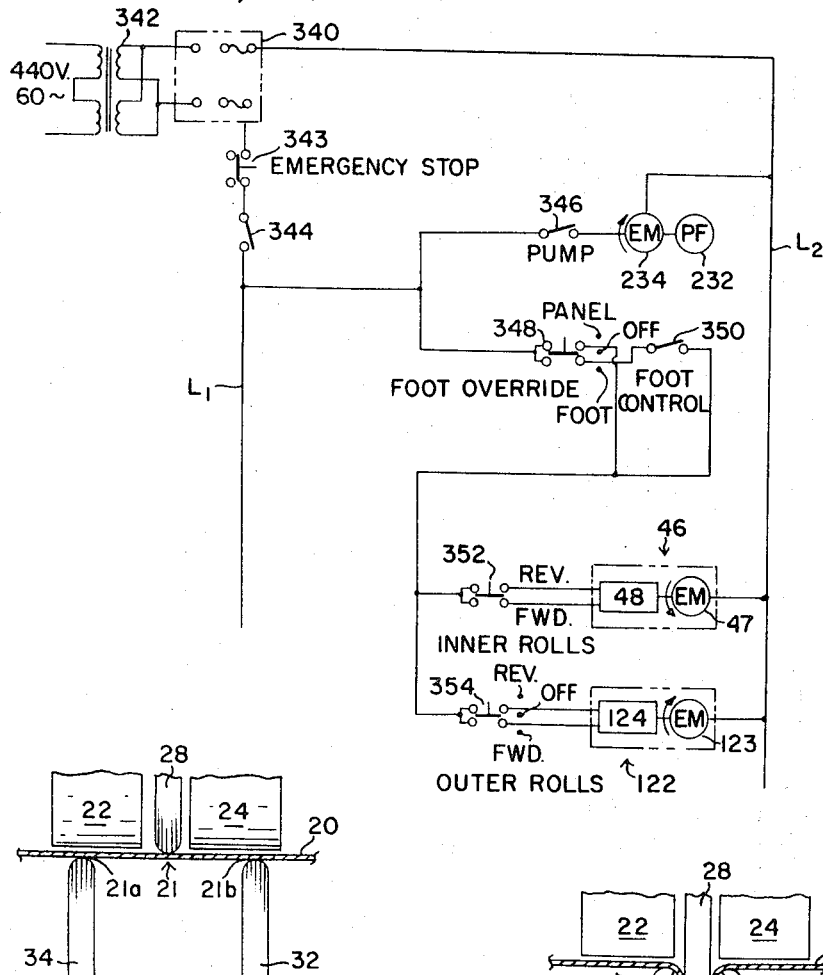
FIG. 5
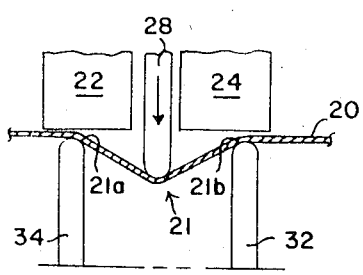
FIG. 6
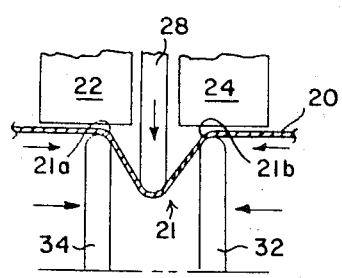
FIG. 7
FIG. 8
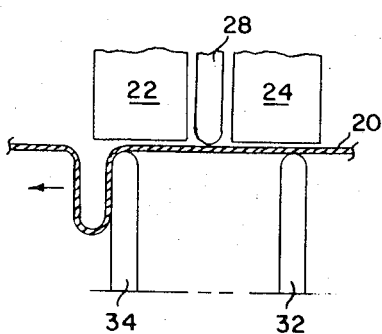
FIG. 9
FIG. 10
INVENTOR.
DONALD W. MILLER
BY Strauch, Nolan, Neale,
Nies & Kurz
ATTORNEYS United States Patent Office 3,564,888
Patented Feb. 23, 1971

3,564,888
CONVOLUTION FORMING METHOD AND APPARATUS
Donald Walter Miller, San Diego, Calif., assignor to International Harvester Company, San Diego, Calif., a corporation of Delaware
Filed Nov. 19, 1968, Ser. No. 776,942
Int. Cl. B21d 15/06
U.S. Cl. 72—110                                      10 Claims

ABSTRACT OF THE DISCLOSURE

Method and apparatus for forming a convolution in a selected area of a tubular workpiece comprising moving an inner forming roll radially outwardly of the tubular axis to force the central portion of the selected area outwardly while the end portions of the selected area are moved toward each other by a pair of spaced, automatically laterally displaceable outer forming rolls.

BACKGROUND OF THE INVENTION

This invention relates to a method and apparatus for forming sheet metal and more specifically to a method and apparatus for forming a series of convolutions in a tubular sheet metal member.

The invention essentially comprises an improvement over known prior art convolution forming devices and particularly the method and apparatus illustrated in U.S. Pat. No. 2,781,075 granted to L. W. Russell on Feb 12, 1957.

The Russell system has been used successfully for some years to produce convolutions in tubular members. However, as the need for deeper convolutions and closer tolerances increased, the Russell procedure for forming deep convolutions developed into quite a costly and time consuming operation. In the Russell forming method, the external forming rolls are maintained laterally stationary during the forming process and, in order to fully form a deep convolution, the appartus must be periodically stopped while the external rolls are manually laterally repositioned, with this procedure being repeated until a convolution of desired depth and configuration is obtained. In addition to lengthening the time required for the forming operation, the stopping of the apparatus and manual repositioning of the forming rolls have introduced inaccuracies into the system, thereby rendering it difficult to control and maintain design tolerances with respect to depth, configuration, and material thickness of the finished convolution.

SUMMARY OF THE INVENTION

Accordingly, the primary object of this invention resides in the provision of a novel method and apparatus capable of forming convolutions in a tubular workpiece by a substantially continuous metal forming procedure in which the thickness and uniformity of the material forming the convolution are accurately controlled within close tolerances.

Another object resides in the provision of a novel method and apparatus by which convolutions of varying depth, configuration, and thickness may be rapidly and easily formed in a tubular workpiece, with this versatility and ease of operation resulting in a substantial reduction in manufacturing costs.

Another object resides in the provision of a novel method and apparatus for forming convolutions to a predetermined depth in a selected area of a tubular workpiece in which an inner forming roll positioned within the workpiece adjacent the selected area is shifted radially outwardly and a pair of outer forming rolls externally adjacent the selected area are shifted laterally toward each other, the inner and outer rolls cooperating to deform the material in the selected area into a convolution of desired depth and configuration.

Still another object resides in the provisioin of a novel method and apparatus as above described particularly useful for forming deep convolutions in a tubular workpiece to close tolerances and in which stretching and thinning of the material from which the convolution is formed may be substantially reduced and the convolution may be of substantially uniform thickness throughout.

A further object resides in the provision of a novel method for forming convolutions in a selected area of a tubular workpiece wherein the central portion of the selected area is moved radially outwardly while the end portions thereof are simultaneously displaced longitudinally toward each other to form a convolution of desired depth and configuration.

A still further object resides in the provision of novel apparatus for automatically performing the above described method comprising an inner forming roll positioned interiorly of a tubular workpiece adjacent a selected area and mounted for movement radially outwardly of the tubular axis to force the central portion of the selected area outwardly of the workpiece. A pair of spaced outer rolls, which are exteriorly positioned adjacent the selected area and are automatically movable laterally toward each other, cooperates with the inner roll as it moves radially outwardly to form a convolution by moving the end portions of the selected area longitudinally toward each other as the central portion thereof is displaced outwardly by the inner roll.

A related object resides in the provision of a novel fluid control system for controlling the lateral movement of the outer forming rolls described above and being adjustable to vary the rate of movement of the outer rolls in a predetermined relation to movement of the inner roll, thereby providing convolutions of predetermined varying depths and configurations.

Other objects and advantages will become apparent from reading the detailed description of a preferred embodiment which follows and from the appended claims.

BRIEF DESCRIPTION OF THE DRAWINGS

FIGS. 1A and 1B are partially fragmented front elevations of an apparatus constructed in accordance with the invention, with FIG. 1A illustrating the forming roll drive systems and FIG. 1B the forming rolls positioned for operation on a tubular workpiece;

FIG. 5 is a schematic diagram of the electric control system of the invention; and FIGS. 6–10 illustrate diagrammatically the successive stages in the novel convolution forming method according to the present invention.

DESCRIPTION OF PREFERRED EMBODIMENT

Figure 2:
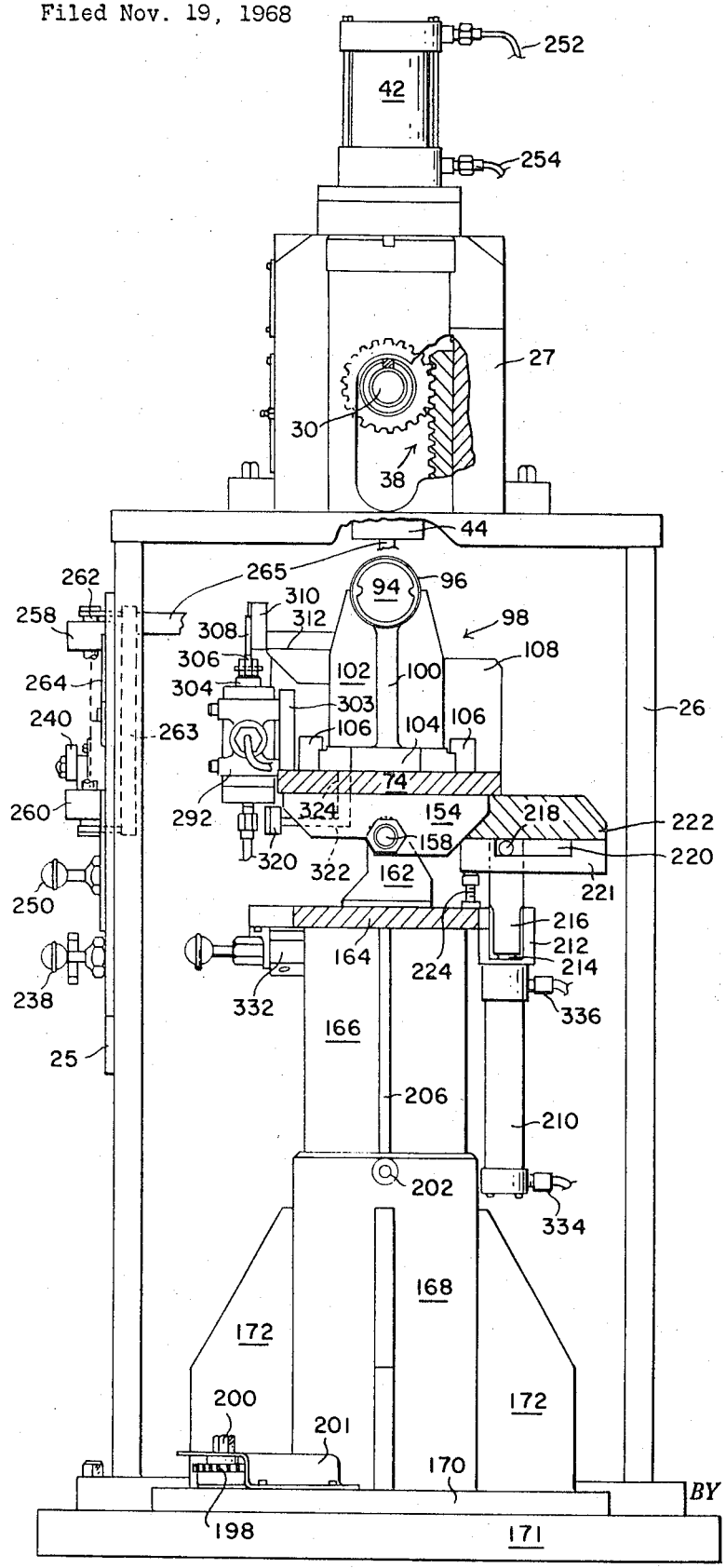
FIG. 2 is a partially sectioned side elevation taken along line 2—2 of FIG. 1B, but with the forming rolls removed from their shafts.

Referring to the drawings, particularly FIGS. 1A and 1B, the novel apparatus of the invention for forming convolutions in tubular workpiece 20 comprises a pair of laterally spaced rotatable guide rolls 22, 24 on which workpiece 20 is loosely slidably supported, with guide rolls 22 and 24 rotatably mounted in a vertically fixed position on frame 27 resting on main housing 26 in a manner which may be identical to that illustrated in Russell Pat. No. 2,781,075.

An inner forming roll 28, keyed on shaft 30 and having a diameter smaller than the inner diameter of guide rolls 22 and 24 is positioned within the workpiece between rolls 22 and 24 and cooperates with laterally movable outer rolls 32 and 34 to form a convolution in the selected area 21 of workpiece 20.

Inner roll 28 is shiftable downwardly, radially outwardly of the outer periphery of guide rolls 22 and 24 by a mounting assembly 35, which includes vertically movable elongated tubular housing 36 through which shaft 30 is rotatably supported, a pair of cooperating gear and rack assemblies 38 and 40 at opposite ends of housing 36, and double acting fluid piston motor 42 having piston rod 43 to which extension arm 44 is connected, with arm 44 being rotatably connected at 45 to the left end of tubular housing 36.

The arrangement of inner roll 28 and mounting assembly 35 is substantially identical to that disclosed in the Russell patent and as in the patent, a three position valve 240 may be positioned to energize motor 42 and extend rod 43 and arm 44 downwardly, displacing inner roll 28 downwardly and radially outwardly of guide rolls 22 an 24 into deforming contact with the center portion of a selected area 21 of the workpiece.

Shaft 30 and inner roll 28 are rotatably driven by drive assembly 46 including reversible variable speed motor 47 flange-connected to reversing controller 48 mounted on main housing 26 by flange support 49 and driving output shaft 50 through speed reducer 52. Universal shaft 54 has universal couplings 56 and 58 at its opposite ends respectively connected to shafts 50 and 30 to provide a drive connection therebetween. Tubular yoke 60 of coupling 58 is splined to the reduced end 62 of shaft 30 to permit sliding axial movement of yoke 60 along end 62 as shaft 30 is reciprocated vertically by mounting assembly 35 and fluid motor 42.

Outer forming roll 32 is keyed on shaft 64 journalled in bearing box 66 which is supported by support assembly 67 including uprights 68 and 70 and horizontal slide support member 72 which reciprocates laterally on table 74 along guide ways 76.

A vertical post 78 fixed to table 74 supports a double acting fluid piston motor 80 whose rod 82 extends through post 78 and is connected to upright 68 by clevis pin assembly 84. A stop rod 86 which is threadably connected to upright 68 and slides freely through post 78 has threaded plugs 88 and 90 at opposite ends thereof on each side of post 78, with the plugs being adjustable along rod 86 to fix the initial position and the limits of reciprocation of roll 32. Stop member 92 fixed on table 74 is positioned to abut slide 72 and thereby establish the innermost limit of reciprocating movement of support assembly 67 and roll 32.

Similarly, as illustrated in FIGS. 1B and 2, outer roll 34 is keyed on shaft 94 journalled in bearing box 96 which is supported by support assembly 98 including uprights 100, 102 and horizontal slide 104 which reciprocates on table 74 along ways 106. Vertical post 108 fixed to table 74 supports piston actuator 110 whose rod extends through post 108 and is connected to upright 102 by a clevis assembly identical to assembly 84.

Threaded stop rod 114 which is connected to upright 102 and slides freely through post 108 has stop plugs 116 and 118 at opposite ends thereof on each side of post 108, with the plugs being adjustable along rod 114 to fix the initial position and limits of reciprocating travel of roll 34. A stop 120 fixed on table 74 is positioned to abut slide 104 and thereby limit the distance of lateral travel of roll 34.

Thus, it is apparent that, upon suitable actuation of piston motors 80 and 110, support assemblies 67 and 98 and outer forming rolls 32 and 34 will be moved laterally toward each from the set position shown in FIG. 1B, with a maximum distance of movement established by a predetermined setting of stop rods 86 and 114 and their respective stop plugs.

Referring to FIGS. 1A and 1B, shaft 94, on which outer roll 34 is fixed, is preferably positively rotatively driven during the forming operation by drive assembly 122 which includes reversible, variable speed motor 123 flange-connected to reversible controller 124 mounted on flange 126 connected to housing 26 and driving output shaft 128 through gear reduction unit 130. A universal drive shaft assembly 132 drive connects output shaft 128 to intermediate shaft 134 supported in housing 26 by bearing assembly 136 and drive connected to roll shaft 94 by universal drive assembly 138. Drive unit 138 includes shaft 140 connected at one end to shaft 134 by universal coupling 142, the other end being slidable within tubular shaft 144 which is connected to reduced end 95 of shaft 94 by universal coupling 146. A pair of screws 148 extend through the wall of tubular shaft 144 and ride in keyway 150 on shaft 140 to prevent relative rotation between shafts 140 and 144, but still permit sliding movement of shaft 140 within shaft 144 as roll 34 and support assembly 98 are reciprocated laterally.

Although not illustrated, outer roll 32 may also be positively driven by a drive assembly similar to that provided for roll 34, or, for some operations, both rolls 32 and 34 may be idler rolls.

As best shown in FIGS. 1B and 2, table 74 has a pair of bottom flanges 152 and 154 which are respectively pivotally connected at 156, 158 to end flanges 160, 162 of support plate 164. Plate 164 is mounted on cylindrical tubular column 166 which slides within cylindrical support 168 supported from a foundation 171 on platform 170 by angle flanges 172.

Column 166 is closed by end plate 174 having central aperture 176 and bottom recess 178 to receive a collar 180 having an annular flange 182 fitting in recess 178, with screws 183 passing through flange 182 and into plate 174. A supporting screw jack 184 is threaded upwardly through collar 180 and has a locking nut 186 on the end thereof to prevent collar 180 and column 166 from threading off jack 184. The lower end 188 of jack 184 is reduced in diameter and passes through opening 190 in platform 170 and has a nut 192 threaded on its bottom end to retain it for rotary movement in opening 190. A sprocket 194 is keyed on end 188 and is driven through chain 196 by sprocket 198 rotatably mounted on shaft 199 in platform 170 outside cylinder 168 and rotatably driven in either direction by a suitably operated hexagonal nut 200 connected to the end of shaft 199 and extending upwardly through sprocket cover 201. Thus, rotation of screw jack 184 through sprockets 198 and 194 will cause column 166 and outer rolls 32, 34 and their mounting structure to be raised or lowered, with screws 202 and 204 riding in respective column side recesses 206, 208 guiding column 166 for vertical movement.

Referring now particularly to FIG. 2, table 74 and the outer roll structure supported thereon are pivotable about pivots 156 and 158 by actuation of fluid piston motor 210 suspended from plate 164 by U-bracket 212. Piston rod 214 is connected to an upwardly extending bar 216 having pin 218 riding in slot 220 provided in lower spaced arms 221 of bracket 222 connected to and extending rearwardly of table 74. Upon upward extension of rod 214 and bar 216, pin 218 rides in slots 220 as bracket 222 and table 74 are pivoted about pivots 156 and 158 to pivot outer rolls 32 and 34 forwardly as viewed in FIGS. 1B and 2. Normally, the bottoms of arms 221 rest upon adjustable screw stop 224 which establishes the horizontal working position of table 74 and rolls 32, 34.

Figure 3:
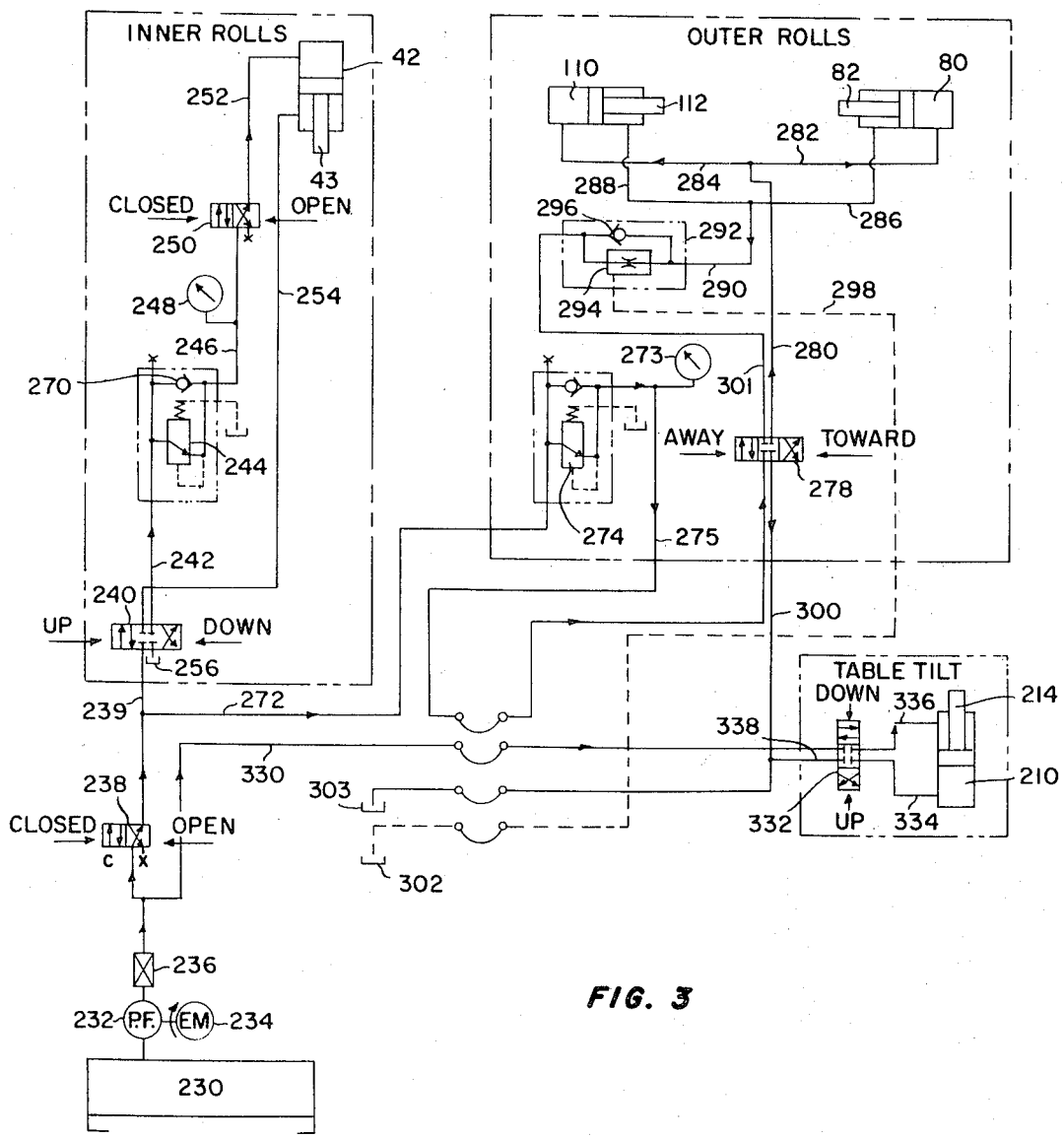
FIG. 3 is a schematic diagram of the fluid control system of the invention.

Movement of the forming rolls 28, 32, and 34 is regulated by the hydraulic fluid control system and electrical control system illustrated, respectively, in FIGS. 3 and 5.

Referring first to FIG. 3 and the fluid control circuit for fluid motor 42 which vertically reciprocates upper roll 28, fluid is pumped from reservoir 230 by pump 232 driven by motor 234 through valve 236 to a main two position valve 238 which is shown in "open" position. Fluid then flows through conduit 239 to three position valve 240 having "down," "up," and "closed" positions, the valve being shown in the "closed" position. When valve 240 is moved to "down," fluid flows through conduit 242 and pressure regulating valve 244 to conduit 246 in which pressure gauge 248 is connected and onto two position valve 250. With valve 250 positioned "open" as shown, fluid continues to flow through conduit 252 to the upper end of fluid motor 42 to move piston rod 43 downwardly. Fluid will exhaust from the bottom end of motor 42 through conduit 254 to drain 256 of valve 240 which, as noted above, will be in the "down" position. The rate at which piston rod 44 moves downwardly may be controlled by varying the fluid pressure delivered to motor 42 by adjustment of regulating valve 244.

Downward movement of piston rod 44 causes downward shifting of mounting assembly 35 and inner roll 28, the amount of shifting being determined by a predetermined setting of stop lugs 258 and 260 (FIGS. 1A and 2) adjustably slidably mounted along rod 262 which is suspended from parallel rod 263 through panel slot 25a, rod 263 being connected to the bottom of extension arm 44 by L-shaped bracket 265 shown fragmented in FIG. 2. Indicating scale 264 fixed on housing 26 indicates the setting of lugs 258, 260. As rod 262 moves down with arm 44, lug 258 will contact lever 266 connected to handle 241 of valve 240 to close the valve and stop fluid flow to the top of motor 42, thereby stopping downward movement of roll 28.

Roll 28 may then be shifted upwardly by manually positioning valve 240 in "up" position to direct fluid through line 254 to the lower end of motor 42, with fluid from the upper end then exhausting through conduit 252, "open" valve 250, line 246, check valve 270, and conduit 242 to drain 256. Upward movement of roll 28 is arrested when lug 260 contacts lever 268 connected to handle 241 to again close valve 240.

Figure 4:
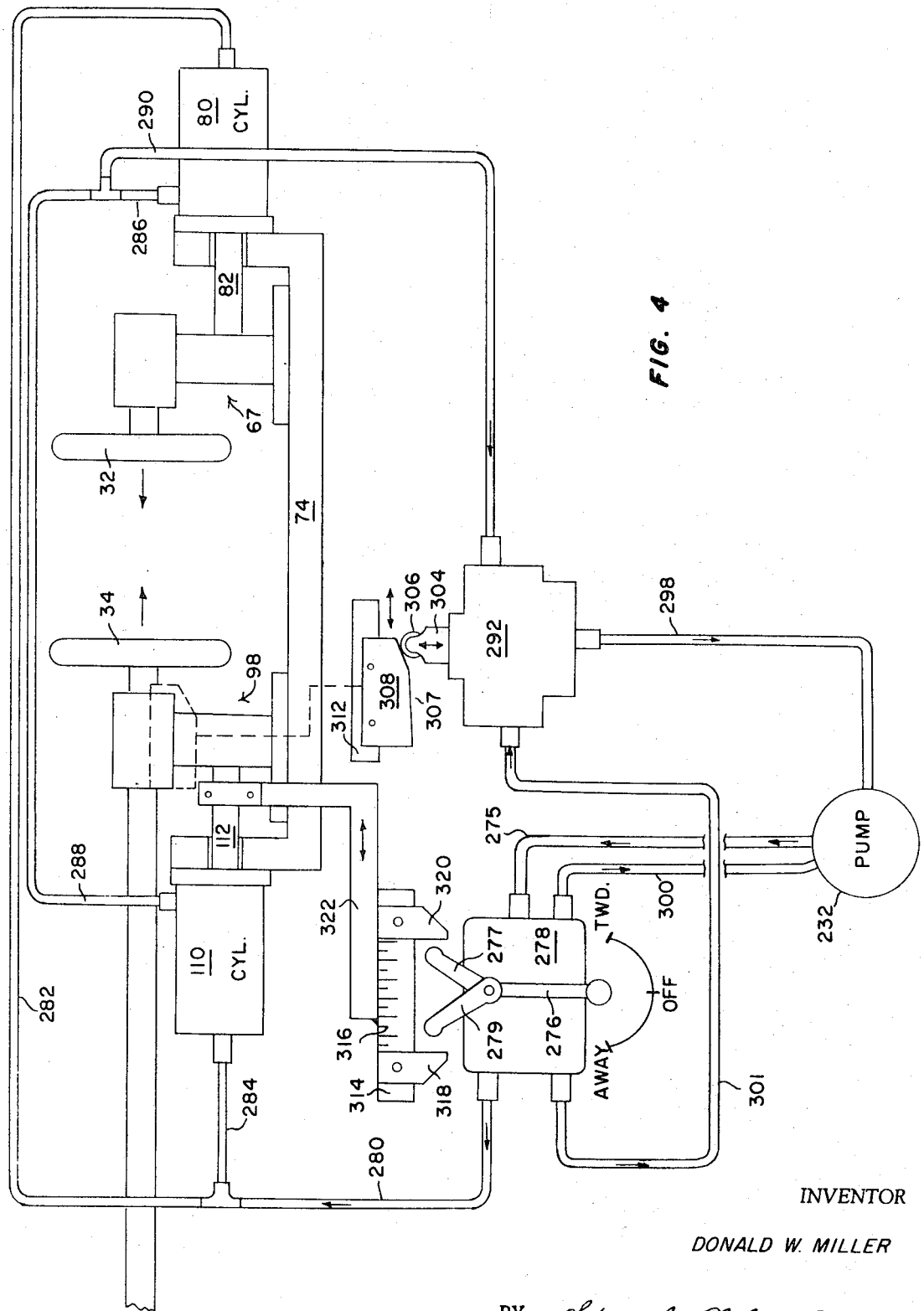
FIG. 4 is a schematic illustration of a part of the fluid control system of FIG. 3 illustrating the relationship between the outer forming rolls and the fluid control valves regulating the lateral movement thereof.

Referring next to the control system for regulating lateral movement of outer rolls 32, 34 as illustrated in FIGS. 1B, 3, and 4, fluid flows from valve 238 through conduit 272, pressure regulating valve 274, conduit 275 to three position valve 278 shown in "closed" position. When valve handle 276 is positioned in "toward" position, fluid then flows through conduits 280, 282, and 284 to the back ends of fluid motors 80 and 110 to extend piston rods 82 and 112, which moves outer rolls 32 and 34 and their respective support assemblies 67 and 98 forwardly toward each other.

The rate of forward lateral movement of piston rods 82, 112 and outer rolls 32 and 34 is controlled by the rate at which fluid exhausts from the front ends of motors 80 and 110 through conduits 286, 288, 290 and a cam operated, variable positionable flow valve 292 having a variable cam controlled flow orifice 294 employed when fluid enters the valve at one end through conduit 290, but bypassed by check valve 296 when fluid enters the valve at the opposite end and flows freely therethrough from conduit 301 when valve 278 is in "away" position. When fluid passes from conduit 290 through orifice 294, it will drain through conduit 298 to drain 302.

As illustrated in FIGS. 1B and 2 and schematically in FIG. 4, variable valve 292 is supported from upright plate 303 fixed to table 74 and includes a vertically slidable stem 304 which controls the flow position of orifice 294, the stem having a cam roller follower 306 rotatably mounted on the top thereof. A template 308 (FIGS. 2 and 4) is connected to face plate 310 of bracket 312 fixed to upright 100 of support assembly 98 for roll 34. Thus, as template 308 moves laterally with upright 100 and roll 34, cam follower 306 follows the cam face 307 of the template to adjust the flow area of orifice 294, and thereby regulate the rate of exhaust of fluid from the front ends of motors 80 and 110 to control the variable rate forward lateral movement of rolls 32 and 34.

The maximum limits of lateral movement of rolls 32 and 34 are established by a horizontal bar 314 (FIGS. 1B and 4) having an indicating scale 316 along lugs 318, 320 are slidably adjustable, with bar 314 being connected to support assembly 98 for lateral movement therewith by L-shaped extension arm 322 (FIGS. 2 and 4) which moves in slot 324 in table 74. When roll 34 has moved laterally a predetermined distance depending on the setting of lugs 318 and 320, lug 318 will contact lever 279 connected to valve handle 276 to close the valve and automatically stop fluid flow to the back ends of motors 80 and 110, and thereby stop forward lateral movement of the rolls.

Similarly, when valve handle 276 is manually positioned in "away" position with fluid flowing through conduit 301, freely through check valve 296 and conduits 290, 286, 288 to the front ends of cylinders 80 and 110, rolls 32 and 34 will move reversely away from each other at a uniform rate independent of cam 308 and orifice 294 until lug 320 engages lever 277 connected to valve handle 276 to close valve 278 and thereby stop reverse lateral movement of the rolls.

The rate of forward lateral movement of rolls 32 and 34 toward each other may be varied simply by providing a number of interchangeable templates 308 having differing cam faces 307 to vary the cam action on follower 306. However, in all cases the contour of cam face 307 is such that cam follower 306 and stem 304 are initially in a normal up position in which fluid may be freely exhausted from the front ends of the cylinders through conduit 290 and valve 292, thereby initially permitting rapid forward lateral movement or rolls 32 and 34. However, as template 308 is moved laterally with roll 34, follower 306 and stem 304 are moved downwardly along cam face 307 to reduce the flow area of orifice 294 of valve 292 and thereby restrict the flow of fluid exhausted through conduit 290 and slow the rate of lateral movement of rolls 32 and 34 until valve 292 is closed to completely stop rolls 32 and 34.

Valve 292 is a conventional valve such as a Vickers valve Catalogue No. C–712A or an equivalent, and may be designed so that follower 306 and stem 304 have a vertical travel distance of approximately ½" between a fully open raised position to a closed—lower—position.

From the above, it is apparent that convolutions of various depths and configurations may be formed by varying the speed of rotation of inner roll 28 by proper adjustment of drive assembly 46, the distance of vertical travel thereof established by a predetermined setting of stop lugs 258 and 260 and the rate of downward travel by adjusting pressure regulating valve 244. Additionally, lateral movement of outer rolls 32, 34 is controlled to cooperate with inner roll 28 in a predetermined correlative manner by selection of an appropriate template 308 and proper adjustment of stops 318 and 320.

Referring again to FIG. 3, with respect to the control system for tilting table 74 and outer rolls 32, 34 fluid flows through conduit 330 to three position valve 332 shown in the "off" position. To tilt the table, valve 332 is manually positioned in "up" to pass fluid through conduit 334 to the bottom end of fluid piston motor 210, with fluid from the top end being exhausted through conduit 336, valve 332, and conduits 338, 300 to drain 303. To return the table to its normal horizontal position, it is necessary only to position valve in "down" to direct fluid to the top of cylinder 210.

As schematically shown in FIG. 5, the electrical control system for the apparatus of the invention comprises conductors $L_1$, $L_2$ connected to a 440 volt, 60 cycle source through fuse box 340 and transformer 342. An emergency switch 343 and main control switch 344 control current flow to pump motor 234 through switch 346 and to the respective inner and outer roll drive assemblies 46 and 122 through a three position switch 348 which in a "foot" position places the drive motor assemblies under control of foot operated switch 350 or in a "panel" position in which switch 350 is bypassed. A pair of three position switches 352 and 354 control respectively the direction of rotation of motors 47 and 123 through the respective reversing controllers 48 and 124. As shown in FIG. 1a, the several switches may be conveniently mounted on control panel 25 on the front of housing 26.

A typical convolution forming operation will now be described with particular reference to FIGS. 6–10. The tubular workpiece 20 is loosely slidably supported on idling guide rolls 22, 24 with forming rolls 28, 32, and 34 positioned adjacent a selected area 21, the ends 21a and 21b of which are defined by rolls 32 and 34 as shown in FIGS. 1B and 6. Switches 352 and 354 are positioned to drive motors 47 and 123 in opposite directions, and thereby rotate inner roll 28 and outer roll 34 oppositely to rotate tubular member 20 and idling guide rolls 22 and 24. Outer roll 32 is an idling roll although it may also be positively driven similar to roll 34.

Valve 240 will then be manually positioned in "down" position to actuate motor 42 and initially move roll 28 downwardly radially outwardly between guides 22 and 24 from the position of FIG. 6 to that of FIG. 7 until roll 28 has deformed selected area 21 around outer rolls 32, 34 sufficiently to permit the rolls 32 and 34 to grip ends 21a and 21b of the forming area. At this time, valve 278 is positioned in "toward" position to move rolls 32 and 34 forwardly toward each other as roll 28 continues downward movement as shown in FIG. 8, the rate of lateral movement of rolls 32 and 34 being correlated to the rate of downward movement of roll 28 by regulation of cam operated valve 292 as previously described. During the movement shown in FIG. 8, a minimum of material stretching in area 21 occurs since ends 21a and 21b are also moved toward each other and the material of tube 20 adjacent each side of area 21 slides freely along guides 22 and 24.

When the rolls reach the position of FIG. 9 as determined by the contour of cam face 307 and also the setting of stop lugs 258 and 318 which function to move valves 240 and 278, respectively automatically to "closed" positions and stop downward movement of roll 28 and lateral movement of rolls 32, 34, the selected area 21 will have been deformed to provide a convolution of desired depth and configuration.

Valve 240 will next be manually positioned in "up" to move roll 28 upwardly and valve 278 manually positioned in "away" to move rolls 32, 34 away from each other until the rolls are returned to their start positions, after which valve 332 is positioned "up" to tilt table 74 and rolls 32, 34 to permit tubular member 20 to be repositioned along guides 22, 24 as shown in FIG. 10, whereby the forming operation may be repeated to form the next convolution.

Thus, it will be appreciated that the above described method and apparatus accomplish the objects initially set forth in that they are capable of readily forming convolutions of various depths and configurations while controlling the material thickness thereof to extremely close tolerances by reducing the amount of material stretching and thinning to a minimum.

It should also be noted that, while it is ordinarily desirable to minimize stretching of the material and thereby produce convolutions of uniform thickness, the described method and apparatus may also function to selectively stretch the material and form very thin convolutions if so desired merely by properly setting the correlation between the ratio of movement between the inner and outer forming rolls.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for forming a convolution in a selected area of a tubular workpiece comprising, guide rolls for supporting said workpiece at points closely adjacent said selected area, an inner forming roll, means mounting said inner forming roll internally of said workpiece opposite said selected area, means for shifting said mounting means to move said inner roll radially outwardly of said guide rolls, a pair of outer forming rolls, means mounting said outer rolls externally adjacent said selected area, and means for moving said outer rolls longitudinally of said workpiece toward and away from each other, whereby said inner roll is movable radially outwardly of said guide rolls and said outer rolls are movable laterally toward each other to thereby form a convolution in said workpiece.

2. Apparatus for forming a convolution according to claim 1, said inner forming roll mounting means comprising a rotatably driven power shaft having one end mounted within said guide rolls with said inner roll mounted on said one end, and said outer roll mounting means comprising means rotatably supporting said outer rolls including a shaft for each of said rolls and drive means connected to at least one of said outer roll shafts for driving said one shaft and roll.

3. Apparatus for forming a convolution according to claim 1, said outer roll moving means comprising fluid motor means connected to each of said outer roll mounting means, and fluid pressure means operating on said motor means to move said mounting means and outer rolls longitudinally of said workpiece.

4. Apparatus as defined in claim 3, said fluid pressure means comprising fluid circuit means having first valve means selectively controlling the flow of fluid to opposite ends of each said fluid motor means, second variable positionable valve means connected to one end of each of said motor means for controlling the rate of flow of fluid therefrom when said first valve means is positioned to direct fluid to the respective other ends, and control means for positioning said second valve means and thereby control the rate of lateral movement of said outer rolls toward each other.

5. Apparatus as in claim 4, said second valve means freely fluid connecting said first valve means and said respective one end of each said motor means when said first valve means is positioned to direct fluid to said one end, whereby said outer rolls are moved away from each other at a substantially uniform rate, independently of said control means.

6. Apparatus as defined in claim 4, wherein said control means comprises cam means responsive to lateral movement of said outer rolls and operative to variably position said second valve means during said lateral movement to vary the rate at which fluid is exhausted from said one end of each said motor means, and thereby vary the rate of lateral movement of said outer rolls toward each other.

7. Apparatus as defined in claim 6, said cam means connected to one of said outer roll mounting means for lateral movement therewith and being positioned to control reciprocating movement of a cam follower for said second variable positionable valve means, said cam means having a cam face which generally moves said cam follower from an open toward a closed valve position to thereby decrease the rate of lateral movement of said outer rolls as they approach each other.

8. A method of forming a convolution in a selected material area of a tubular workpiece comprising initially moving the central portion of said area radially outwardly of said workpiece while substantially restraining the end portions thereof against outward movement, and subsequently continuing radial outward movement of said central portion while simultaneously moving side end portions longitudinally toward each other until a convolution of desired depth and configuration is formed.

9. A method of forming a convolution in a selected material area of a tubular workpiece as defined in claim 8, wherein said end portions are moved toward each other at a variable rate of lateral displacement.

10. A method of forming a convolution in a selected material area of a tubular workpiece as defined in claim 9, wherein said rate decreases as said end portions approach each other.

References Cited
UNITED STATES PATENTS

| | | | |
|---|---|---|---|
| 1,645,971 | 10/1927 | Riegel | 72—370 |
| 3,122,830 | 3/1964 | Dawson et al. | 72—370 |

LOWELL A. LARSON, Primary Examiner

U.S. Cl. X.R.

72—370